Aug. 4, 1931. A. E. YOUNG 1,816,949
MEASURING APPARATUS
Filed March 25, 1929 2 Sheets-Sheet 2
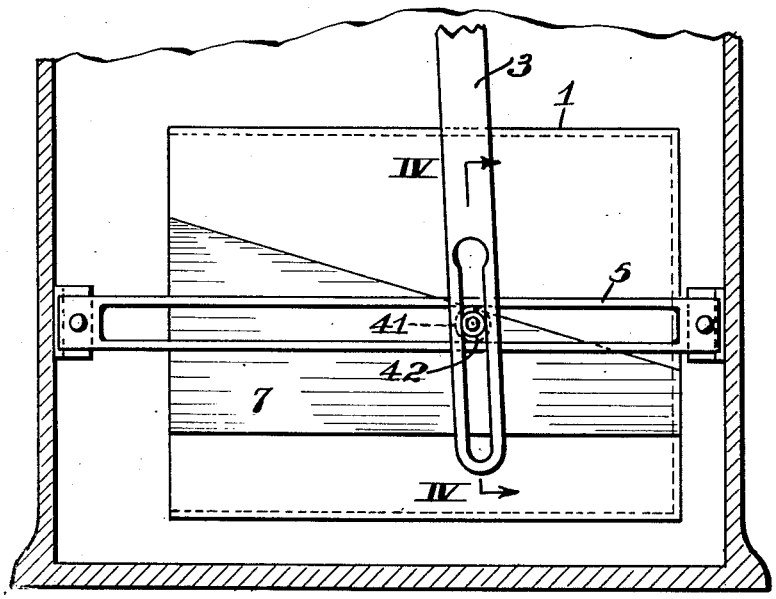
Fig. II.
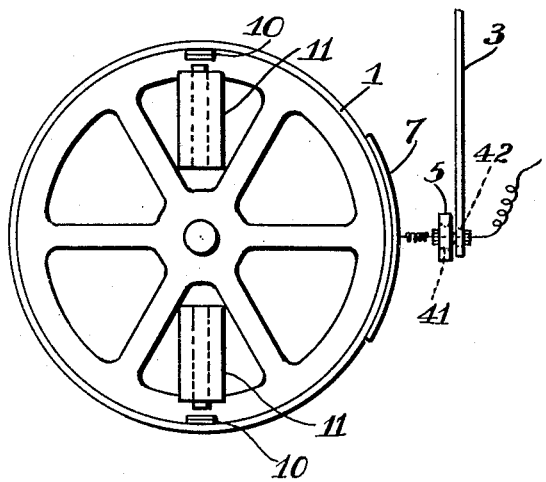
Fig. III.
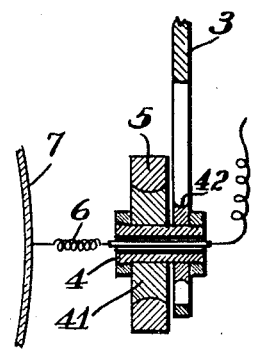
Fig. IV.
WITNESS
A B Waddock
INVENTOR
Archer E. Young
by Christy and Christy
his attorneys Patented Aug. 4, 1931

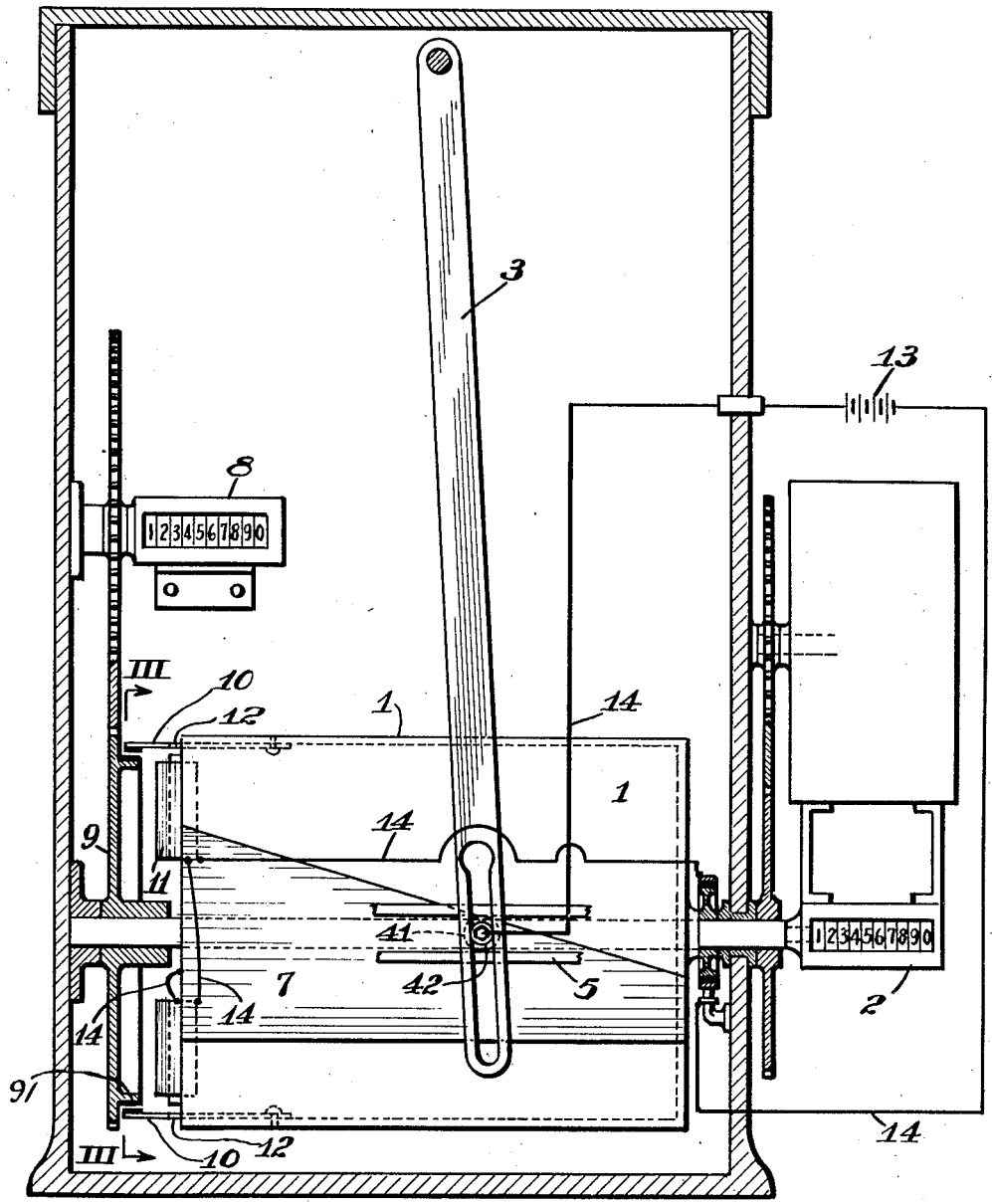

1,816,949

UNITED STATES PATENT OFFICE

ARCHER E. YOUNG, OF PITTSBURGH, PENNSYLVANIA

MEASURING APPARATUS

Application filed March 25, 1929. Serial No. 349,639.

My invention relates to apparatus for aggregating through prolonged intervals of time the value of a variable. I shall show and describe the invention in application to the measurement of gas, and then indicate its wider applicability.

In the accompanying drawings Fig. I is a view in vertical section of gas-measuring apparatus built and operating according to my invention; Fig. II is a fragmentary view, showing in side elevation a portion of the same apparatus; Fig. III is a fragmentary view, showing in end elevation the apparatus shown in Fig. II; Fig. IV is a fragmentary view to larger scale, on substantially the plane indicated at IV—IV, Fig. II.

A cylinder 1 mounted for rotation may by known instrumentalities be caused to rotate in synchronism with a positive meter—a meter, that is to say, which makes direct volumetric measurement of gas in advance from a place of supply to a place of consumption. In such case, each revolution of the cylinder will be indicative of the advance of a given volume of gas. The cylinder may be geared directly to a tally 2, and the apparatus may be so adjusted that the tally shall afford direct reading of the cubic feet of gas passed by the meter.

In the arrangement thus far described no provision is made for variability in the density of the gas measured; and, while I find it desirable to include in my apparatus the means described for the direct volumetric measurement of gas, I associate with these other means of measurement, in which correction is made for variability in the pressure and correspondingly in the density of the gas measured.

A pivoted arm 3 of relatively great length may by known instrumentalities be caused to swing in response to variation in the pressure of the gas as it is measured, so that the particular position of the arm 3 will always be indicative of the extant condition of pressure. A block 4 movable along suitable ways in a course parallel with and adjacent to the surface of cylinder 1 may be movable in a slot in crank arm 3 also, to the end that the particular position of block 4 along the face of cylinder 1 shall be indicative of the extant condition of pressure of the gas being measured. The particular structure shown in Fig. IV is advantageous. The block 4 takes the form of a cylindrical pin on which are freely and independently rotatable two rollers 41 and 42; one of these rollers moves in a slot in a bar 5 which extends longitudinally adjacent the face of cylinder 1; the other roller moves in a slot in crank arm 3.

Block 4 carries insulated within its bore a conductor which ends in an elastic terminal 6, and this terminal bears upon the surface of cylinder 1. The surface of the cylinder, elsewhere of insulating material, carries a face plate 7 of conducting material which partially covers it. This face plate may, for example, be formed as a metallization of a portion of the surface of the cylinder. The face plate 7 is of such shape and proportions that its circumferential extent varies from point to point longitudinally of the cylinder, to the end that as the cylinder rotates the terminal 6 shall bear upon the face plate throughout an arc of greater or less extent, according to the position of block 4 along bar 5. As the pressure increases, it may be understood that block 4 moves from right to left (Figs. I and II), and as the block so moves to the left its period of contact with plate 7 during each rotation of the cylinder will be prolonged. The surface 7 may be so proportioned as to afford correction for variation in the condition of pressure under which the gas is measured, in accord with Boyle's law. Indeed, more accurate correction may be made than computation under Boyle's law can afford; for as pressure increases an appreciable factor of inaccuracy appears in computation under Boyle's law, and by modification in the shape of the surface 7 that factor of inaccuracy may be eliminated.

A circuit is closed when terminal 6 bears upon surface 7, and when the terminal passes from surface 7 and bears upon the otherwise insulating surface of cylinder 1 that circuit is broken again. So long as the circuit is closed, rotation of cylinder 1 effects the drive of a tally meter 8, and such being the case, tally meter 8 may be made to afford summation of gas measured, with correction for variations in pressure. Temperature is the only remaining factor in the measurement of gas for which correction is not afforded in the operation of my apparatus, and the inaccuracy due to temperature variation may be disregarded, or correction for temperature variation may in known manner be computed.

The preferred means for driving tally 8 from cylinder 1 while the electric circuit is completed through terminal 6 and face plate 7 are illustrated in Figs. I and III. Gear wheel 9, the first of the gear wheels which make up the tally 8 is mounted idly upon the axle of cylinder 1 and is arranged adjacent the end of cylinder 1. Gear wheel 9 carries integrally a clutch member, conveniently a concentrically arranged friction drum 91. Cylinder 1 carries a complementary clutch member. This cylinder-borne clutch member conveniently takes the form of a movable arm or arms extending beyond the end of the cylinder, and movable to and from frictional engagement with drum 91. The arms may be made of flexible material, and electro-magnets may be provided to swing the arms against spring tension. Thus the arms may be caused to assume one or another of their alternate positions in response to the energizing and de-energizing of the electro-magnets. An adequate arrangement is shown in the drawings. The cylinder 1 carries two arms 10 arranged at diametrically opposite positions. These arms 10 are flexible; they are anchored to the cylinder, each at one end, at points remote from the end of the cylinder, and at their free ends they are movable in the direction radial to the axis of rotation. Normally they extend across the face of drum 91 and stand spaced at a slight interval from the face of the drum.

The cylinder 1 carries one or more electro-magnets 11, corresponding in number to the arms, and placed adjacently to the arms. Normally the arms 10 stand remote, free of contact with the face of drum 91; but when the electro-magnets 11 are energized the arms are drawn against spring tension into contact with the drum; and when the electro-magnets are de-energized the arms return again under spring tension to their normal position, out of contact with the surface of the drum.

The details of structure indicated in the drawings are preferable. The arms 10, otherwise magnetically inert, carry applied blocks 12 of magnetic material (soft iron) suitably placed with respect to the electro-magnets. The meeting faces of drum 91 and of arms 10 are covered with rubber or equivalent friction-affording material. By such particular provisions the gear wheel 9 may be made delicately responsive to the making and breaking of contact between terminal 6 and surface 7. So long as the circuit is closed gear wheel 9 will turn in unison with cylinder 1. When the circuit is open the tally, including gear wheel 9, will stand at rest. Should the friction of parts be found insufficient to hold the tally at rest while the circuit is broken, it is within common engineering knowledge to add to the tally a brake adequate to effect that end.

A source of electric energy is diagrammatically indicated at 13, and the line wires for energizing the electro-magnets at 14.

The provision of the constantly driven tally 2, in addition to the intermittently driven tally 8, is not necessary. Its presence, however, may be found convenient and useful, particularly under conditions of uniformly continuing pressure, the two tallys being checks one upon the other.

It manifestly is possible to mount the arms 10 and their electro-magnets 11 upon a member separate from cylinder 1 but rotating in unison with cylinder 1; and, such separation being made, the circuit which operates the electro-magnets may be a relay circuit, derived from the circuit made and broken by the rotation of cylinder 1. Cylinder 1 then being mounted adjacent the positive meter, the tally 8 may be situated at a convenient and remote point, so that the attendant is not under the necessity of visiting the positive meter in order to obtain his readings—at least, his readings of tally 8 alone.

I have shown and described my invention in specific application to gas measurement. The block 4 moves longitudinally of the constantly rotating cylinder 1, and makes intermittent contact with the surface 7 upon the cylinder; the circumferential extent of surface 7 varies from point to point throughout the length of the cylinder; and the tally 8 affords summation of the value of the circumferential extent of the surface 7 at the point or points at which block 4 stands in the course of a given interval of time. Wherever summation is to be made of the value of a variable through a given interval of time, that variable being susceptible of expression in the position of a block movable along a guideway, the apparatus described is applicable.

I claim as my invention:

1. In apparatus for aggregating the value of a variable during successive intervals of time, a rotating member and a rotatable member, a rotation-imparting member borne by said rotating member and movable radially with respect to the axis of rotation to and from rotation-imparting engagement with the rotatable member, means for moving said rotation-imparting member to such engagement and maintaining it in such engagement during a greater or less fraction of a complete rotation of said rotating member, according to the value of the variable during successive periods of rotation.

2. In apparatus for aggregating the value of a variable during a prolonged interval of time, a rotating cylinder and a tally including a rotatable member mounted coaxially with said rotating cylinder, an arm borne peripherally by said cylinder and extending from said cylinder and movable radially with respect to the axis of rotation of said cylinder to engagement with said rotatable member, and means for swinging said arm to engagement with said rotatable member and for maintaining it in such engagement during a greater or less fraction of a rotation of said cylinder, according to the value of the variable during successive periods of rotation.

In testimony whereof I have hereunto set my hand.

ARCHER E. YOUNG.